US006437315B1

(12) United States Patent
Skalski

(10) Patent No.: US 6,437,315 B1
(45) Date of Patent: Aug. 20, 2002

(54) RADIATION-BASED CONTACTLESS POSITION REFERENCE SYSTEM AND METHOD FOR ELEVATORS

(75) Inventor: Clement Alexander Skalski, Avon, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/584,233

(22) Filed: May 31, 2000

(51) Int. Cl.[7] .................................................. G01V 3/00
(52) U.S. Cl. .................................. 250/221; 250/559.38
(58) Field of Search ................................ 250/221, 216, 250/559.38; 187/134, 394; 356/375, 376, 373

(56) References Cited

U.S. PATENT DOCUMENTS 6,079,521 A * 6/2000 Schonauer et al. ......... 187/393
6,100,540 A * 8/2000 Ducharme et al. ..... 250/559.38
6,253,879 B1 * 7/2001 Skalski et al. .............. 187/287

FOREIGN PATENT DOCUMENTS

GB 2211046-a * 10/1987

* cited by examiner

*Primary Examiner*—Robert H. Kim
*Assistant Examiner*—Hoon K. Song

(57) ABSTRACT

A position reference system for an elevator car includes a laser that emits a beam that is reflected from a mirror. Either the laser or the mirror is in a non-moving position, while the other is fixed to the elevator car and moves with it. The laser beam is modulated at two frequencies, one of which provides a coarse position of the elevator car while the other provides a fine position of the elevator car. Position calibration occurs when the elevator car is stationary. When the elevator car begins to move, the coarse position is tracked while the fine position is determined from the higher of the two modulation frequencies. The absolute position of the moving elevator car is thus always known to a degree of accuracy depending on the higher modulation frequency.

15 Claims, 1 Drawing Sheet

RADIATION-BASED CONTACTLESS POSITION REFERENCE SYSTEM AND METHOD FOR ELEVATORS

FIELD OF THE INVENTION

This invention pertains to the field of elevators, and in particular, to determining the absolute position and velocity of a moving elevator car.

BACKGROUND OF THE INVENTION

To stop an elevator smoothly and level with a landing, the system must know when to initiate the stop, when to go into a leveling mode, and when to begin opening the elevator car doors. To perform these functions, it is necessary to know the exact position of the car at all times. Installations, especially high-rise installations, typically use a digital encoder known as a primary position transducer (PPT) to monitor the travel of the car in the elevator hoistway. The PPT is mounted in the machine room in a position that allows a steel toothed tape ("selector tape") to be directly hitched to the frame of the car. As the car moves up and down the hoistway, the selector tape drives a sprocket or tape sheave which in turn drives the rotor of the PPT to provide a constant digital readout of the car position to within 1/64th of an inch.

Mounting a selector tape requires a sheave in the machine room and an idler sheave in the elevator pit to keep the tape from fluttering. The tape is alongside the elevator car within the hoistway and requires additional space for installation. Today, the design emphasis is on making the "footprint" of the entire elevator system as small as possible, so as to maximize usable space in the building for whatever purpose is intended for the building itself. To this end, an alternate way of determining the car position is desired.

SUMMARY OF THE INVENTION

Briefly stated, a position reference system for an elevator car includes a laser that emits a beam that is reflected from a mirror. Either the laser or the mirror is in a non-moving position, while the other is fixed to the elevator car and moves with it. The laser beam is modulated at two frequencies, one of which provides a coarse position of the elevator car while the other provides a fine position of the elevator car. Position calibration occurs when the elevator car is stationary. When the elevator car begins to move, the coarse position is tracked while the fine position is determined from the higher of the two modulation frequencies. The absolute position of the moving elevator car is thus always known to a degree of accuracy depending on the higher modulation frequency.

According to an embodiment of the invention, a position reference system for an elevator car includes emission and response means for emitting electromagnetic radiation from a source, and causing a response from the response means when the electromagnetic radiation strikes the response means; modulation means for modulating the electromagnetic radiation at two different frequencies; means for determining if the elevator car is stationary; calibration means, when the elevator car is stationary and responsive to the modulation means, for calibrating the system when the elevator car is stationary to determine an initial position of the elevator car; coarse position means, responsive to the initial position of the elevator car and the modulation means, for determining a coarse position of the elevator car when the elevator car is moving; fine position means, responsive to the modulation means, for determining a fine position of the elevator car when the car is moving; and means, based upon the coarse position and the fine position, for determining an absolute position of the elevator car when the elevator car is moving.

According to an embodiment of the invention, a method for determining an absolute position of an elevator car includes the steps of emitting electromagnetic radiation from a source, and causing a response from a response device when the electromagnetic radiation strikes the response device; modulating the electromagnetic radiation at two different frequencies; determining if the elevator car is stationary; calibrating, responsive to the step of modulating and the step of determining, the system when the elevator car is stationary to determine an initial position of the elevator car; determining, responsive to the initial position of the elevator car and the step of modulating, a coarse position of the elevator car when the elevator car is moving; determining, responsive to the step of modulating, a fine position of the elevator car when the car is moving; and determining, based upon the coarse position and the fine position, an absolute position of the elevator car when the elevator car is moving.

DETAILED DESCRIPTION OF THE PREFERRED EMBODIMENT

The constant speed of light in air (vacuum) can be used to obtain range information by measuring the transit time of pulses of radiation. This is the principle used in first radars. Rather than using pulses, continuous wave (CW) amplitude modulated (AM) radiation may be used. Comparison of the phase of the envelopes of the transmitted and returned waves permits determination of range. The higher the modulation frequency, the higher is the resolution of the system. However, phase can only be measured to 360 degrees without ambiguity. This limits the range of the system. This limitation is overcome in present commercial systems by ranging using two or more modulation frequencies. This requires two or more identical systems (not really practical) or time multiplexing of the modulation frequencies. Systems using multiple frequencies solve the ambiguity problem, but require too much time per cycle to permit control of position of a conventional passenger elevator.

There is no ambiguity with the Otis Smart Primary Position Transducer (SPPT) once it is initialized. The SPPT is described in U.S. Pat. No. 5,274,203 incorporated herein by reference. The SPPT is a quasi-absolute encoder in that it measures position within coarse zones. Using the idea of zones and measurement within each zone, the ambiguity in laser range finders based on phase measurement can be eliminated while at the same time attaining the fastest possible updates of the position of a moving target.

A contactless position reference system for elevators based on radiation is described here. It is in essence a laser-SPPT. The system is economical enough to use in low-rise elevators, while being suitable for high-rise elevators since it can range to distances of 500 m or more.

Figure 1:
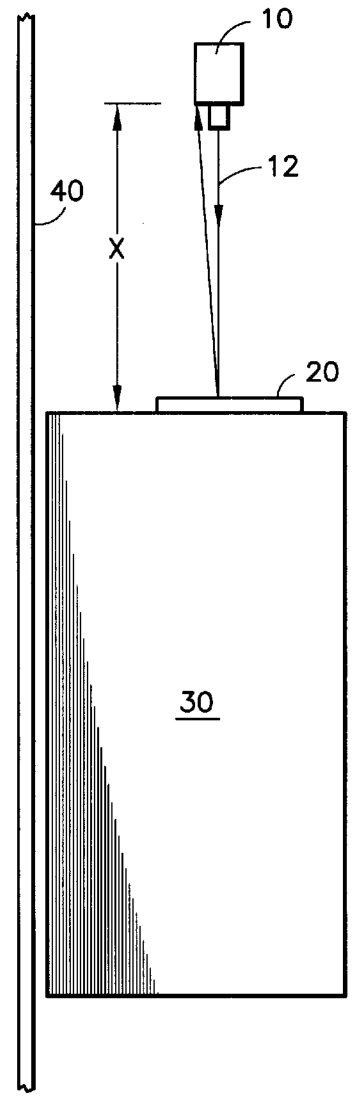
FIG.1 Prior Art
FIG. 1 shows a laser position reference system according to an embodiment of the invention.

Referring to FIG. 1, a sensor 10 is placed in the overhead (the top part of the elevator hoistway) and projects a beam

12 onto a reflector 20 on the top of an elevator car 30. Beam 12 is reflected back to a detector in sensor 10. Alternate placements of sensor 10 and reflector 20 include placing reflector 20 in the overhead with sensor 10 on car 30, placing sensor 10 in the pit (the bottom part of the elevator hoistway) and reflector 20 on the bottom of car 30, and placing sensor 10 on the bottom of car 30 with reflector 20 in the pit. As car 30 travels up and down along guide rail 40, beam 12 changes in length and the time for beam 12 to leave sensor 10 and return is directly proportional to the length of beam 12.

Beam 12 is preferably electromagnetic radiation that travels at a speed of $c=3*10^8$ m/s. Although a laser system is preferable due to the increasing availability of commercial laser rangefinders, any frequency of electromagnetic radiation is possible, except that the lower frequencies don't provide adequate speed or resolution. A system using microwave radiation may be implemented using either a reflector or a transponder. The transponder rebroadcasts a received signal and helps eliminate problems associated with multipath reflections.

The fact that the speed of the radiation is a constant in vacuum can be used to find the distance from the sensor to the reflector X. This distance is called the range. The range can be determined from a transit time measurement T. Thus, $$2*X=c*T.$$

The resolution required on T is defined by 2*X/c. For X=1 mm, the time increment is $6.67\ 10^{-12}$ sec. This is very difficult to measure unless many measurements are made and averaged.

An alternative way of measuring range is to use a variant of the method of Fizeau who used it to measure the velocity of light in 1849 [Greene, J. R., Short Range Distance Measurement by Electromagnetic Phase Comparison Techniques, *Geophysical Prospecting*, v. 25, pp. 269–279; 1977]. Fizeau used a rotating disk having notches to modulate the light transmitted to a reflector 6 km away. The returned beam of light was viewed through the notches of the same disk used to chop the transmitted beam. He adjusted the speed of the disk until he saw no light coming back. This signified a phase shift of 2 π radian.

The modern version of Fizeau's experiment uses a radiation source and an electronic modulator capable of working to hundreds of megahertz. The phase shift in radians between transmitted and returned beams is easily shown to be $$2*X*f/c*2\pi,$$

where f=modulation frequency. For f=100 MHZ and a phase shift of 2 π, X=1.5 m.

The example just worked shows that by measuring phase to 2 π radians, range can be measured from zero to 1.5 m. The phase as given by the above equation can increase to an arbitrarily large value. Phase, however, can only be measured directly over a 2 π range. Thus $$\text{phase\_meas}=\text{phase}-2\pi(n-1),$$

where n=zone number. It is well known that by choosing a second modulation frequency, the zone can be determined. For a modulation frequency of 1.0 MHZ, unambiguous ranging is possible over 150 m. Thus for a system using modulation frequencies of 100 and 1 MHZ, the unambiguous range of 150 m can be considered in terms of 100 zones. Using the lower modulation frequency, the zone can be found. The position within the zone is found using the higher modulation frequency. However, although this technique works for a stationary elevator when there is plenty of time to establish the position, this techniques is too slow to measure the position of an elevator while the elevator is running and leveling.

Figure 2:
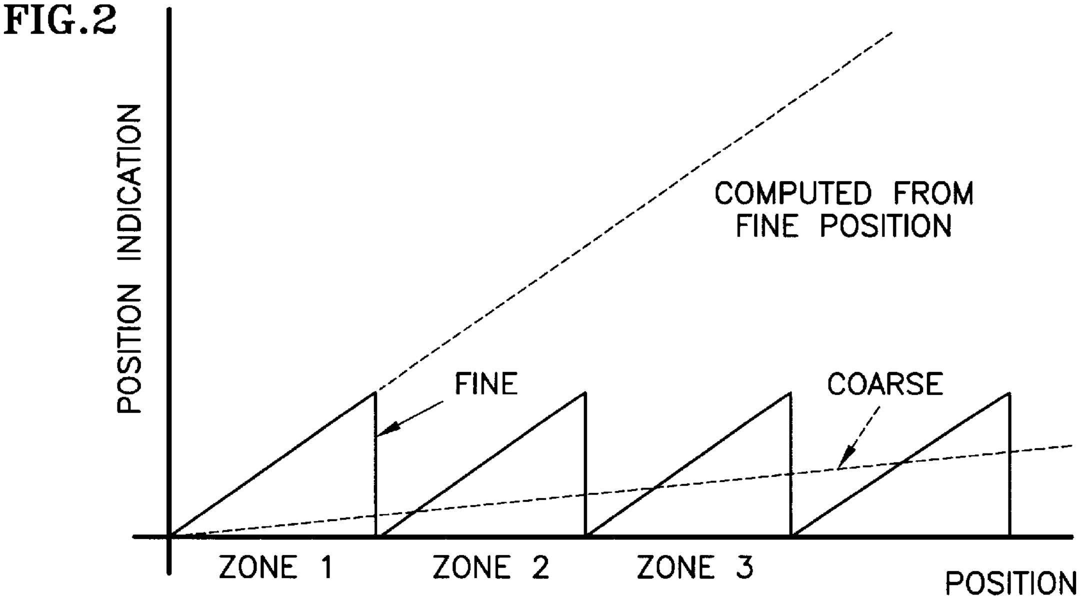
FIG. 2 shows a graph showing position as a function of fine position and coarse position measurement.

Referring to FIG. 2, the process just described is illustrated. The measurements made using the 100 MHZ and 1 MHZ modulation are shown as fine and coarse, respectively. The zone can be established using the coarse measurement. However, this procedure is not fast enough for practical use with an elevator system while the elevator is moving. Therefore, in the present invention, the zone is found entirely from the fine measurement once the initial zone is known. As the elevator car 30 moves and measurements are made of the fine position, abrupt changes are noticed. It is possible to anticipate when these changes will occur, since the zone length is known precisely. Possible pseudocode to determine position is illustrated below. The parameter zone_length is known.

```
1. zone=zone as determined from coarse measurement
2. fine_pos=measured fine position
3. measure=1
4. while measure=1
5. fine_pos_old=fine_pos
6. fine_pos=measured fine position
7. if (fine_pos−fine_pos_old)>zone−length/2
8. then
9. zone=zone−1
10. end if
11. if (fine_pos−fine_pos_old)<-zone−length/2
12. then
13. zone=zone+1
14. end if
15. position=zone*zone_length+fine_pos
16. if stop=desired
17. then measure=0
18. end while
```

The above pseudocode shows the idea of how to continually obtain position from only the fine position measurement. It is only illustrative of the basic technique and many variants are possible. Also, actual code may use tests on the data to assure consistency, code to cope with momentary interruption of the radiation, etc.

The use of multiple frequencies for accurate ranging over long distances is governed by limitations in the phase measuring apparatus. Generally, phase accuracy on the order of one part in 1000 is possible in a system of moderate cost. Turning again to the example, accuracy to 1500/1000=1.5 mm is possible using the 100 MHZ modulation frequency. Zone can be determined to within 150 mm using the 1 MHZ modulation. The principle of operation just described is embodied in various forms of commercial phase-based ranging instruments. This includes the ranging sensors made by Phase Laser Systems (PLS) of Scottsdale, Ariz. and by Leica Geosystems (Leica) of Heerbrugg, Switzerland. These instruments are used primarily for general purpose ranging such as terrestrial surveying, measuring liquid level, etc. so the time to acquire range in these instruments in some instances is several seconds. Such a long time is not suitable for tracking an elevator. Present Otis E411 systems operate with approximately 40 ms delay on the utilization of SPPT information. Thus a laser-SPPT having a tracking delay of 40 ms or less can be used directly in E411 systems. Simulation studies have shown that tracking delays up to 150 ms can be tolerated with slight returning of the motion control.

The requirements for a laser-SPPT are defined in the following excerpts from a functional specification for a laser position sensor. The concept unit is envisioned as a pair of specialized single-laser range finders joined mechanically and incorporating an outboard speed-check circuit fed by each of the range finders. For primary position measurement, the following specifications are preferred: a range of 100 m, encoding of 20 bits (1,048,576), nominal resolution of 0.5 mm, repeatability of 2 mm, and maximum tracking delay for target moving at constant velocity of 40 ms. Requirements for the secondary position measurement are preferably the same as for the primary position measurement.

The position increment is defined in terms of the diameter of the sheave used with the SPPT. The sheave diameter D is given in millimeters as is the position increment deltax. The SPPT is scaled to 4096 counts per revolution. Thus $$\text{deltax}=\pi D/4096$$

The value of deltax is 0.3896 mm for the most commonly used SPPT sheave diameter D of 508 mm. The effective value of D is 651.899 mm for a deltax=0.5000 mm. The transmitted position is preferably in counts of the increment deltax.

The laser-sensor assembly functions fundamentally in a ranging mode such that the distance from the assembly to the target is determined. Compatibility with the SPPT requires that position is referenced to a zero point somewhere in the pit and that increasing position is upward. Let the following definitions be used:

R=range from sensor to target on the primary channel (mm)

H=distance from sensor to reference point (mm)

Then the position for control of the elevator is $$X=H-R$$

Typically with the car parked at the first landing, X=10,000 mm. The parameters D and H are preferably capable of being preset in the position sensor such that the floor table already set within the controller is matched.

The secondary channel must be registered to the primary channel within 20 mm.

The laser sensor modules within the sensor assembly preferably self-calibrate during operation. This requires that the target be stationary. The motion state of the target (elevator car) is known to the controller to which the sensor assembly is connected, thus permitting generating a logic signal indicating when dynamic calibration may be performed. The hardware preferably provides a logic high (nominally 5.0 V) when dynamic calibration is permitted. A logic zero (nominally 0.0 V) preferably signifies that it is unknown if the target is stationary. The maximum time permitted for dynamic calibration is 1.0 sec. This permits operation of the sensor in virtually all elevator systems. Should more time be needed, the possibility is good of getting more time, but each case needs to be examined individually.

Velocity is computed from position and time information for both the primary and secondary channels. Computations are preferably made without sacrificing numerical accuracy. The preferred procedure is to compute velocity approximately every 10 ms and maintain a running average of 8 computations. Eleven bits and a sign bit is the preferred output. Scaling is preferably defined by the SPPT sheave diameter D. The fundamental scaling is 0.25 rpm per count for a sheave of diameter D. For D=508 mm, the scaling is equivalent to 6.65 mm/s/count. A "1" sign bit preferably signifies a negative velocity.

Although not as accurate, an alternate way of computing the velocity involves using $$\text{vel}=(x2-x1)/\text{deltat}$$

Where deltat is a time increment of approximately 50 ms and x1 and x2 are the positions determined at the beginning and end of the time increment. When a request is made for velocity, the last available computation is output. This means that the velocity could have a staleness as great as 75 ms. At a maximum acceleration rate of 1200 mm/s^2, this results in a velocity error of 90 mm/s which can be accommodated by speed check tolerances within the elevator system controller. Velocity in the SPPT is scaled at 0.25 rpm/count. For a sheave diameter D, the scaling required for the new sensor is $$\text{vel\_scaling}=\pi D/240$$

For a value of D=508 mm, vel_scaling=(6.65 mm/s)/count.

Initialization preferably must occur automatically on power-up, and preferably be accomplished within 2 sec. The transducer preferably signals that it is not initialized by transmitting that the binary position on both the primary and secondary channels is zero.

The primary and secondary position channels must be independent. Failure of either the primary channel or the secondary channel preferably shall not affect the other channel. The objective here is to detect failure in the primary channel by comparing with the secondary channel. This comparison is preferably performed in the controller that receives information from the sensor.

Data is preferably transmitted at a rate not to fall below 9.6 kBaud. Faster speeds are desirable. The cycle time is preferably fast enough to permit updating position and velocity information at least every 10 ms. In order to prevent elevator vibrations during deceleration, the car position is preferably updated just before responding to the controller with a position/velocity update.

In addition to the position, a laser ranging system is capable of determining the velocity of elevator car 30. A discrete speed check signal is therefore preferably provided to indicate that the speed is below a prescribed threshold (the speed check).

An example of the technique to be used to control an elevator position using a laser-SPPT is summarized as follows. First, with the elevator car stationary at time of startup, the sensor is initialized within 1.0 sec. Next, the elevator car 30 is run using single-frequency updates since zone transitions are known to be contiguous. The elevator speed is never expected to exceed 15 m/s (most elevators have top speeds of less than 4 m/s). Updating the position every 40 ms and using a speed of 15 m/s, the maximum elevator movement is 0.6 m. Since the zones are in this example are defined 1.5 m apart, the zone can always be determined with a single-frequency measurement. A further assist in knowing position is that an elevator is always run with a defined direction of travel. This means that the car position changes monotonically except, perhaps, for the last few millimeters of travel.

The position reference system for an elevator car exists for two primary purposes: (1) to accurately and speedily land the elevator car, and (2) to monitor the approximate position for safety purposes. The laser-SPPT can perform both of these functions in addition to providing a redundant position signal for terminal protection. The elevator car velocity is determined as described above. This velocity information is preferably used for safety check purposes such as the door zone speed check used for advanced door opening. The absolute position of the elevator car is checked when the car is stationary in similar fashion as described above with respect to calibration.

The SPPT uses a backup battery if needed to provide car position after power failure and without having to move the car. A backup battery is not needed with a laser-SPPT, since when power is reapplied, the absolute position is automatically determined as part of the initial power-up calibration. The laser-SPPT preferably provides a readout of car position when there is no building power if it is provided with a backup battery and readout means.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A position reference system for an elevator car, comprising:

emission and response means for emitting electromagnetic radiation from a source, and causing a response from said response means when said electromagnetic radiation strikes said response means;

modulation means for modulating said electromagnetic radiation at two different frequencies;

means for determining if said elevator car is stationary;

calibration means, when said elevator car is stationary and responsive to said modulation means, for calibrating said system when said elevator car is stationary to determine an initial position of said elevator car;

coarse position means, responsive to said initial position of said elevator car and said modulation means, for determining a coarse position of said elevator car when said elevator car is moving;

fine position means, responsive to said modulation means, for determining a fine position of said elevator car when said car is moving; and means, based upon said coarse position and said fine position, for determining an absolute position of said elevator car when said elevator car is moving.

2. A system according to claim 1, further comprising means, based upon said coarse position means and said fine position means, for determining a speed and direction of said elevator car when said elevator car is moving.

3. A system according to claim 1, wherein said source is fixed and said response means is mounted on said elevator car.

4. A system according to claim 3, wherein said source is located in an overhead of a hoistway for said elevator car.

5. A system according to claim 3, wherein said source is located in a pit of a hoistway for said elevator car.

6. A system according to claim 1, wherein said response means is fixed and said source is mounted on said elevator car.

7. A system according to claim 6, wherein said response means is located in an overhead of a hoistway for said elevator car.

8. A system according to claim 6, wherein said response means is located in a pit of a hoistway for said elevator car.

9. A system according to claim 1, wherein said response means is a reflector.

10. A system according to claim 9, wherein said electromagnetic radiation is laser light.

11. A system according to claim 1, wherein said response means is a transponder.

12. A system according to claim 11, wherein said electromagnetic radiation is microwave radiation.

13. A system according to claim 1, wherein said fine position means is a radiation-based, phase-measuring sensor such that only a single modulation frequency is used.

14. A method for determining an absolute position of an elevator car, comprising the steps of:

emitting electromagnetic radiation from a source, and causing a response from a response device when said electromagnetic radiation strikes said response device;

modulating said electromagnetic radiation at two different frequencies;

determining if said elevator car is stationary;

calibrating, responsive to said step of modulating and said step of determining, said system when said elevator car is stationary to determine an initial position of said elevator car;

determining, responsive to said initial position of said elevator car and said step of modulating, a coarse position of said elevator car when said elevator car is moving;

determining, responsive to said step of modulating, a fine position of said elevator car when said car is moving; and determining, based upon said coarse position and said fine position, an absolute position of said elevator car when said elevator car is moving.

15. A system according to claim 14, further comprising the step of determining, based upon said steps for determining said coarse position and said fine position, a speed and direction of said elevator car when said elevator car is moving.

* * * * *